United States Patent

[11] 3,619,508

[72] Inventor Benjamin Neiger
20 Saint Pauls Ct., Brooklyn, N.Y. 11226

[21] Appl. No. 887,920
[22] Filed Dec. 24, 1969
[45] Patented Nov. 9, 1971

[54] TELEPHONE BURGLAR ALARM
2 Claims, 2 Drawing Figs.

[52] U.S. Cl. .......... 179/5 P
[51] Int. Cl. .......... H04m 11/04
[50] Field of Search .......... 179/5, 5 P, 2 A, 84 L

[56] References Cited
UNITED STATES PATENTS

| | | | |
|---|---|---|---|
| 3,404,236 | 10/1968 | Halaby | 179/5 R |
| 3,437,759 | 4/1969 | McKinzie | 179/5 R |
| 3,484,561 | 12/1969 | Matthews | 179/2 A |
| 3,469,036 | 9/1969 | Meri | 179/84 L |

*Primary Examiner*—Kathleen H. Claffy
*Assistant Examiner*—David L. Stewart
*Attorney*—Myron Amer

ABSTRACT: An alarm system which is effective to transmit a call for assistance over the telephone lines of the premises in which, in one improved embodiment, an incoming call which ordinarily is effective to "tie up" the telephone lines and thus render it impossible to send the outgoing message for assistance is eliminated as a shortcoming of the system. Specifically, the current causing ringing of the bell system which is produced by the incoming call is used to illuminate a light source which, in turn, causes the diminishment of the resistance of a photocell in a telephone line shunting circuit, all to the end of restoring the outgoing message interval of service to the system.

INVENTOR
BENJAMIN NEIGER

BY Myron Amer
ATTORNEY

TELEPHONE BURGLAR ALARM

The present invention relates to burglar alarm systems, and more particularly to improvements for a burglar alarm system which is operatively associated with the telephone system of the premises being protected.

As generally understood, the telephone system in prevalent current use is operatively arranged for either message-incoming service on the telephone transmission lines or outgoing service, but not both these services at the same time. As a consequence, it is possible and indeed there have already been reported instances in which burglars have defeated the effectiveness of the alarm system by merely calling to the telephone unit on the premises and allowing continued ringing of this unit. The foregoing has the effect of placing and maintaining the telephone system in its message-incoming interval of service, during which, as just noted, the telephone lines cannot be utilized for outgoing-message service and the premises therefor are vulnerable to burglary. In other respects, also, the functioning of the telephone system is susceptible to being used to thwart the effectiveness of the alarm system.

Broadly, it is an object of the present invention to provide an improved telephone-integrated burglar alarm system overcoming the foregoing and other shortcomings of the prior art. Specifically, it is an object to provide a burglar alarm system capable of transmitting over telephone lines with certain improvements for counteracting known significant methods of blocking its operation. In one embodiment demonstrating the invention, the incoming call which, as just noted, heretofore "tied up" the telephone lines, is effectively used to switch the telephone system from its message-incoming to its message-outgoing interval of service and thus the telephone system is restored to the proper condition to cooperate with the message-sending unit of the alarm system to achieve the objective of the alarm system.

Figure 1:
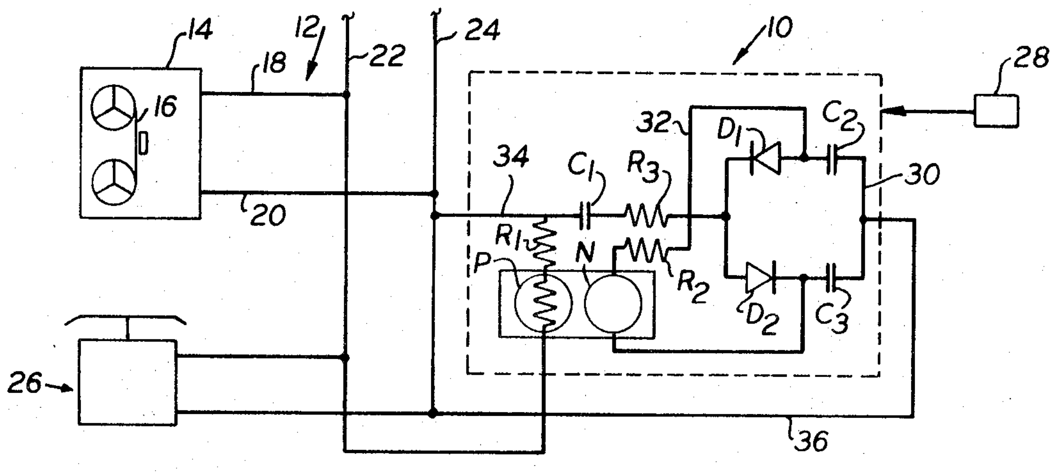
Figure 2:
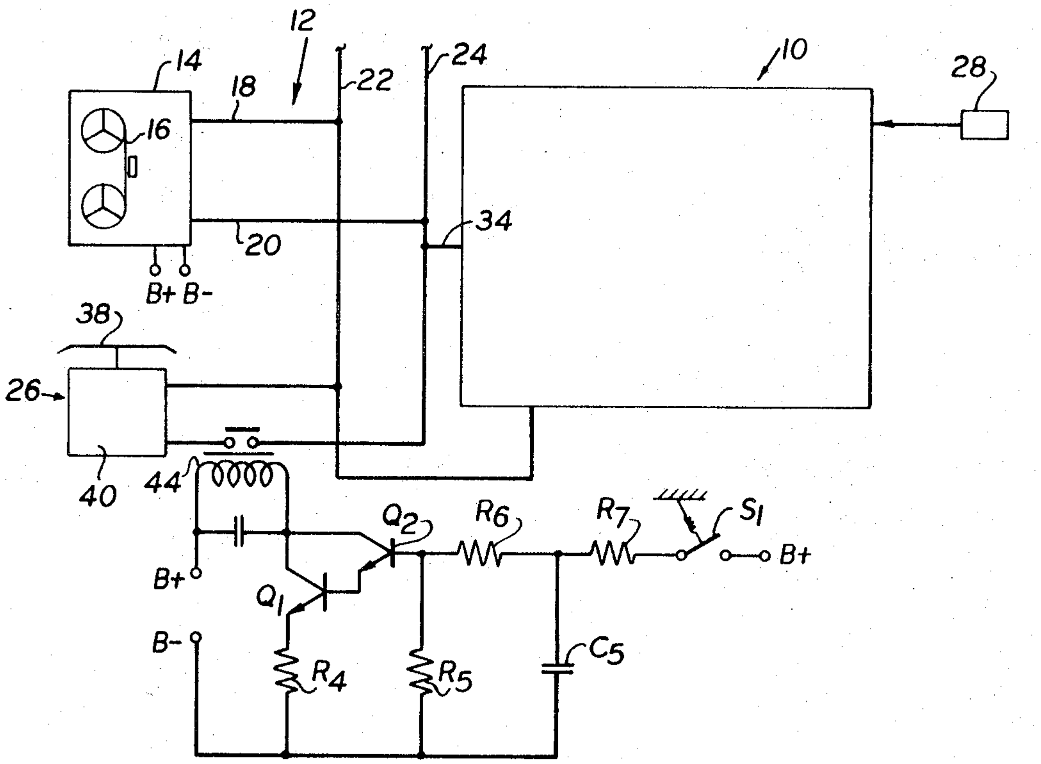

The above description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a circuit diagram of a first embodiment of a telephone burglar alarm system according to the present invention; and FIG. 2 is a circuit diagram of another embodiment thereof.

Shown in FIG. 1 are improvements, generally designated 10, for an otherwise conventional telephone burglar alarm system, generally designated 12. Specifically, the improvements 10, as will be described in detail subsequently herein, eliminate a significant shortcoming which presently exists in conventional telephone burglar alarm systems exemplified by the system 12. To better understand the manner in which this is achieved, it is first necessary to understand that the system 12, as generally understood, includes a message-sending unit 14 in turn including a recorder 16 having a taped message calling for or requesting police assistance in connection with a burglary presumably then in progress, the unit 14 being electrically connected by conductors 18 and 20 to the main telephone lines 22 and 24 of the telephone unit 26 which exists on the premises protected by the telephone burglar alarm system 12.

Also as is generally understood, the telephone system which includes the telephone unit 26 is of the type having either message-incoming service on the telephone lines 22 and 24 or outgoing service thereon, but is not capable of having both these types of services at the same time. The electrical parts and circuitry which are embodied in the telephone units 26 to selectively provide either incoming or outgoing intervals of service are well known and are omitted from this description as unnecessary to an understanding of the present invention. It is necessary to understand, however, that because of this mode of operation of the telephone unit or system 26, it is possible, and indeed there have already been reported instances in which burglars have defeated the effectiveness of the telephone burglar alarm system 12. This is done by the burglar making an incoming call to the telephone unit 26 at a time when he knows that the premises are vacant and then merely allowing the telephone unit 26 to keep ringing. This has the effect of placing and maintaining the telephone system 12 in its message-incoming interval of service which, as just noted, is incapable of transmitting an outgoing message. Thus, when the premises are then burglarized and, even assuming that the burglar opens a door or window which has the desired effect of tripping or otherwise actuating the sensory switch 28, which, in turn, transmits a signal into the burglar alarm system 12 that would ordinarily commence operation of the message-sending unit 14, since the telephone system or unit 26 is in its incoming-message interval of service, the unit 14 cannot be effective in transmitting any telephone messages for help and assistance on the telephone lines 22 and 24.

To overcome the foregoing, the improvements 10 include appropriate means for automatically switching the telephone system from its message-incoming to its message-outgoing interval of service and thus place the system in the proper condition for the transmission by the unit 14 of an outgoing message calling for help or assistance from a police station or other such location which the unit 14 is adapted, in a well-understood manner, to signal. Specifically, the added circuitry 10 includes a first circuit 30 having a pair of capacitors C2 and C3 which are electrically connected by a conductor 32 to a light source N which preferably is a neon light. This circuit 30 is connected by conductors 34 and 36 across the telephone lines 22 and 24. As a consequence, any incoming message over the telephone lines 22 and 24 which, in a well-understood manner, causes the flow of alternating current which causes ringing of the bell system of the telephone unit 26 is tapped off via the conductors 34 and 36 and is effective in causing charging of the capacitors C2 and C3. The diodes D1 and D2 facilitate this charging of the capacitors C2 and C3. Ultimately, an electrical charge of a sufficient extent is created in the capacitors C2 and C3 to, in turn, cause illumination of the neon light N. The duration of this illumination is somewhat prolonged by the resistance R2 in the conductor 32. Also, conductor 34 includes a capacitor C1 and resistance R3 which function in a well-understood manner to regulate the timed duration of the charging of the capacitor C2 and C3 until a sufficient charge is created to cause illumination of the neon light N. That is, by proper selection of the capacitor C1 and resistance R3, charging of the capacitors C2 and C3 to a point where their discharge causes illumination of the neon lamp N can be made to occur after any selected number of rings of the bell system of the telephone unit 26, including even only one ring.

Continuing with the description of the improvements 18, the same has cooperating with the first circuit 30 a second circuit 38 which is directly connected in shunting relation, across the telephone lines 22 and 24. Thus, when the second circuit 38 is electrically complete, the incoming message over the telephone lines 22 and 24 which is effective when reaching the telephone receiver 26 to open up these telephone lines and, in effect, lock or maintain them in an incoming-message interval of service is effectively short circuited by the circuit 38. Stated another way, the electrical completion of the circuit 38 will be understood to place the telephone lines 22 and 24 in condition for its outgoing-message interval of service and thus in condition for the transmitting of a message by the unit 14 in response to an initiating signal from the sensory switch 28.

Circuit 38, however, is normally in an open condition and, to this end, includes a resistance R1 and a photocell means P which, as generally understood, has a characteristically very high resistance of many megohms. However, when the photocell means P is energized, or in other words, subjected to illumination from the neon light source N, its resistance is significantly diminished. When this occurs, the circuit 38 then functions as a shunting circuit for the telephone lines 22 and 24 and, as already noted, places these lines in condition for outgoing-message service. In this manner, the additional and improved circuit 10 effectively counteracts the effect of an incoming call to the telephone unit 26 which, without the improvement 10, would hold and maintain the telephone system 12 in an incoming interval of service and thus inoperative, for all practical purposes, as far as the alarm message-sending unit 14 is concerned.

In addition to the foregoing, the improved circuit of FIG. 1 is also effectively used as a telephone burglar prevention system. In this specific use, the selection of the time delay units C1 and R3 is such that immediately upon the first ring of an incoming call the capacitors C2 and C3 are charged to an extent which causes illumination of the neon light N. This, as already noted, electrically completes the shunting circuit 38. Additionally, it is contemplated that placed in operation at this time is the message-sending unit 14 which will transmit the equivalent of a busy signal, such as is usually transmitted, when the telephone system 12 is already engaged in handling an incoming telephone message. Thus, the caller will be given the impression by the transmitted busy signal that there are occupants at the premises at which the telephone unit 26 is located and, to this extent, will discourage any visits by the caller to the premises. In this connection, it is well known that prior to burglaries, the burglar often checks whether there is anybody at the premises which he intends to burglarize by making a phone call to the premises. If such a call remains unanswered or does not produce a busy signal, it indicates to the burglar that the premises are unoccupied. Thus, with the modifications noted, the additional circuit 10 serves to prevent burglaries as well as to detect the commission of a burglary.

Reference is now made to FIG. 2 wherein there is shown a still further additional improvement to the basic telephone burglar alarm system already described in connection with FIG. 1 and which is identified by the same reference numerals. An additional shortcoming of the telephone burglar alarm systems arises from the fact that the telephone unit 26, including a receiver 38 and supporting cradle 40, is, as generally understood, of the type in which outgoing service, unless achieved directly through the telephone unit 26, is not possible over the telephone lines 22 and 24 when the receiver 38 is removed from its support cradle 40. It is therefore possible for a burglar who actually enters upon the premises during working hours, and thus without tripping or rendering operative any signal from a sensory switch 28 to then remove or cause the removal of the receiver 38 from the support cradle 40 and thus place the alarm system 12 in an inoperative condition. To counteract this, as clearly shown in FIG. 2, there is provided a holdup switch S1 which is adapted to be secretly actuated and has the effect of removing the telephone unit 26 from the telephone lines 22 and 24 and simultaneously commencing the operation of the message-sending unit 14. Specifically, removal of the telephone unit 26 is achieved by the opening of a normally closed switch S2 which is part of a conductor 42 which connects the telephone unit 26 to the telephone lines 22, 24. That is, the momentary closing of switch S1 in turn results in the charging of a capacitor C5 through a resistance R7 and, in turn, causes saturation of a two-stage transistor Q1, Q2, R4, R5, and R6. This saturation, in a well-understood manner, pulls in relay 44 and results, as already noted, in the opening of the normally closed switch S2.

From the foregoing, it should be readily appreciated that there has been disclosed herein improvements for a telephone burglar alarm system which eliminated two major shortcomings of such a system. Specifically, the improved circuit 10 of FIG. 1 eliminates the possibility of maintaining the telephone lines 22 and 24 in incoming telephone service by an outside call to the telephone unit 26. Additionally, the improved circuit 10 can also be used as a burglar-prevention system wherein a busy signal is given to the caller even though the telephone unit 26 is actually not being used in the handling of an incoming call. This aspect of the improvement 10 would be used after business hours or during vacation periods when it does not interfere with normal telephone service. Cooperating with the improved circuit 10 is the additional circuit described in connection with FIG. 2 which eliminates the other major shortcoming of telephone burglar alarm systems by disconnecting the telephone unit 26 from the telephone lines 22 and 24 while simultaneously providing these lines for the use of the message-sending unit 14.

A latitude of modification, change and substitution is intended in the foregoing disclosure and in some instances some features of the invention will be employed without a corresponding use of other features.

What is claimed is:

1. A telephone burglar-prevention system comprising, in combination, a telephone system of the type having an audible signal indicative of telephone message outgoing interval of service in said system, signaling means selectively operable to simulate said audible signal, and means operatively effective to simulate said telephone message outgoing interval of service in said telephone system in response to an incoming telephone call by causing the operation of said signaling means, said means including a first circuit having a capacitor means and a light source, said first circuit capacitor means being adapted to be charged by an incoming ringing signal so as to cause illumination of said light source, and a circuit having a normally high-resistance photocell means in adjacent operative position to said light source electrically arranged to effectively answer an incoming call and initiate operation of said signaling means, whereby said audible signal is produced during intervals of illumination of said light source when said normally high resistance of said photocell is diminished to an extent resulting in the effective operation of said second circuit.

2. A telephone burglar-prevention system as defined in claim 1 including means in said first circuit for regulating the extent of charging of said capacitor means preparatory to the discharging thereof which causes illumination of said light source.

* * * * *